United States Patent
Shinde

(10) Patent No.: US 9,760,407 B2
(45) Date of Patent: Sep. 12, 2017

(54) MOBILE DEVICE BASED WORKLOAD DISTRIBUTION

(71) Applicant: Accenture Global Service Limited, Dublin (IE)

(72) Inventor: Suraj Shinde, Metepec (MX)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 58 days.

(21) Appl. No.: 14/752,656

(22) Filed: Jun. 26, 2015

(65) Prior Publication Data

US 2016/0378567 A1     Dec. 29, 2016

(51) Int. Cl.
*G06F 9/46*     (2006.01)
*G06F 9/50*     (2006.01)

(52) U.S. Cl.
CPC .......... *G06F 9/5083* (2013.01); *G06F 9/505* (2013.01)

(58) Field of Classification Search
None
See application file for complete search history.

(56) References Cited

U.S. PATENT DOCUMENTS

| | | | |
|---|---|---|---|
| 2004/0003029 A1* | 1/2004 | Islam ...................... | G06F 9/505 709/203 |
| 2007/0124684 A1* | 5/2007 | Riel ....................... | G06F 9/5088 715/736 |
| 2008/0189712 A1* | 8/2008 | Boris ..................... | G06F 9/5083 718/103 |
| 2011/0321058 A1* | 12/2011 | Schmidt ................ | G06F 9/5083 718/105 |
| 2012/0174106 A1* | 7/2012 | Seo ........................ | G06F 9/485 718/100 |
| 2012/0246322 A1* | 9/2012 | Patil ....................... | G06F 9/5027 709/226 |
| 2015/0106823 A1* | 4/2015 | Canoy .................... | G06F 9/505 718/105 |

* cited by examiner

*Primary Examiner* — Tuan Dao
*Assistant Examiner* — William C Wood
(74) *Attorney, Agent, or Firm* — Mannava & Kang, P.C.

(57) ABSTRACT

Mobile device based workload distribution may include determining whether a processing requirement for a workload exceeds an operational threshold of an associated mobile device, and detecting, in response to a determination that the processing requirement for the workload exceeds the operational threshold of the associated mobile device, a performance degradation of the associated mobile device. In response to the detected performance degradation of the associated mobile device, the workload may be divided into a plurality of workload portions. A workload portion of the plurality of workload portions may be distributed to a further mobile device for workload processing. Mobile device based workload distribution may further include receiving, from the further mobile device, a processed workload portion related to the distributed workload portion, and assembling the processed workload portion related to the distributed workload portion with a plurality of processed workload portions, for example, for rendering on the associated mobile device.

21 Claims, 5 Drawing Sheets

MOBILE DEVICE BASED WORKLOAD DISTRIBUTION

BACKGROUND

Mobile devices may include devices such as mobile phones, smartphones, personal digital assistants (PDAs), and other such devices. A variety of applications may be installed on a mobile device to perform various types of tasks. Such applications may be pre-installed on a mobile device during manufacture of the mobile device, or downloaded and installed on the mobile device by a user and/or an authorized entity (e.g., a service provider).

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
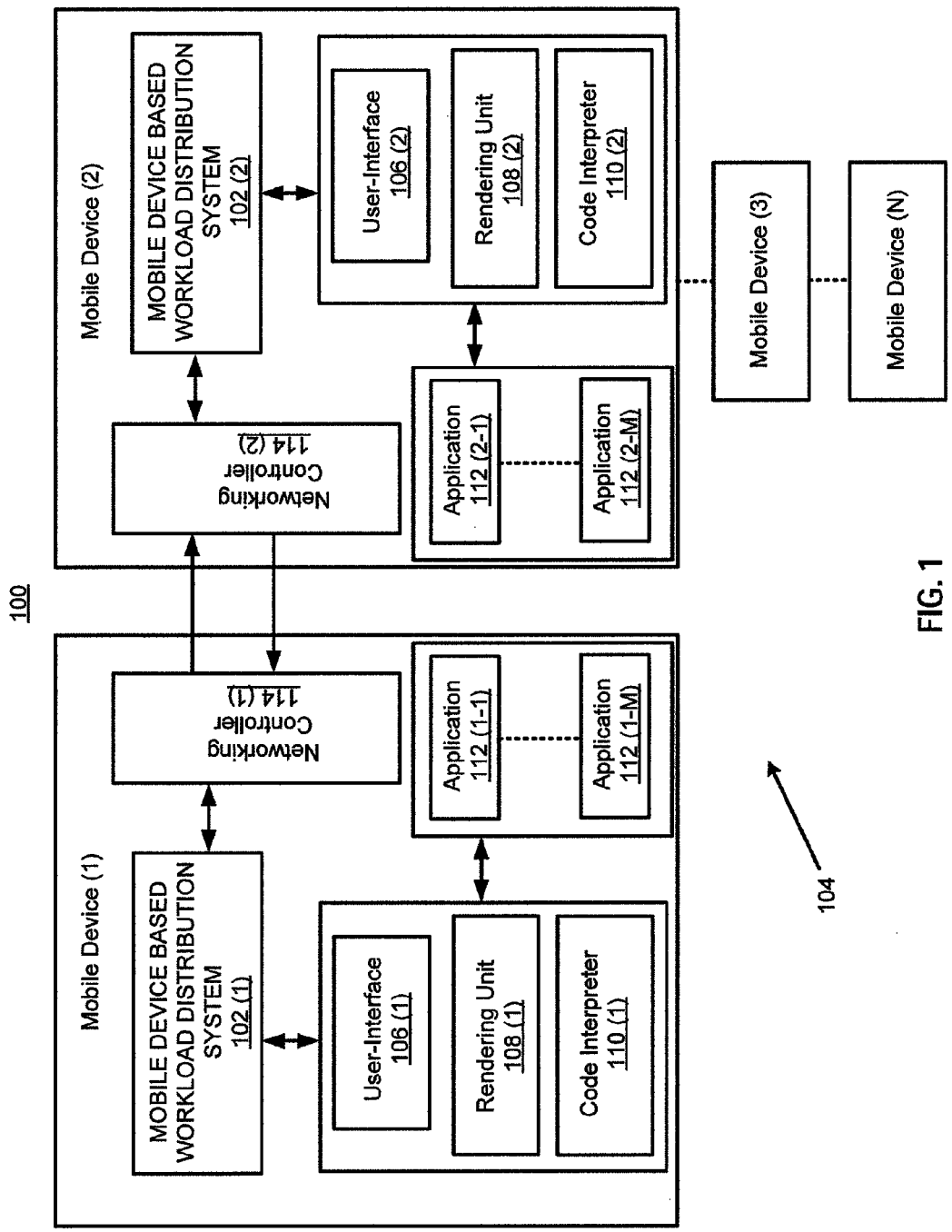
FIG. 1 illustrates an environment including a mobile device based workload distribution system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as to not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Mobile devices such as mobile phones, smartphones, PDAs, and other such devices, may be used extensively for personal as well as non-personal (e.g., job related) purposes. With the advent of mobile devices, hundreds of thousands of mobile applications have been developed, and are downloaded and installed on the mobile devices. Users often spend a significant amount of time using such mobile applications for functional and/or entertainment purposes.

As complexities related to such applications increases, mobile devices need to be built with increased processing power and memory that are sufficient to meet the computational resource requirements needed for such applications. However, many applications require extensive computational resources that may consume a substantial percentage of the mobile device processing power and memory. Moreover, when a plurality of applications is executed in parallel, such applications may also consume a substantial percentage of the mobile device processing power and memory. Examples of applications may include FACEBOOK, YOUTUBE, TWITTER, WHATSAPP, etc. These aspects related to the execution of applications and consumption of a substantial percentage of the mobile device processing power and memory may result in performance degradation of a mobile device, and a negative user experience. Even with the availability of back-end systems, such applications may become overloaded to the extent that they operate significantly slower than their intended speed, or even become unresponsive to the point of failure.

In order to address the aforementioned aspects related to operation of a mobile device, a mobile device based workload distribution system and a method for mobile device based workload distribution are disclosed herein. The system and method disclosed herein may provide for an application, such as a mobile application, to distribute its workload to another mobile device or a plurality of other mobile devices for processing, where each of the mobile devices may belong to a peer-to-peer network. The application may include any type of application that is operable on a mobile device, such as an application that is downloaded on a mobile device, an application that is operable with a web browser on a mobile device, any code (i.e., machine readable instructions) that includes functionality related to an application and/or a web browser generally for mobile devices. Further, although the examples disclosed herein have been described with references to mobile devices, the system and method disclosed herein may also be operable with computers, servers, in a virtual environment, and any environment where processing capabilities of a device or a set of devices is limited. The workload of the application may be divided into workload portions, processed in parallel on another mobile device, or a number of distinct mobile devices of the peer-to-peer network, and the results of the processed workload portions may be re-assembled on the originating mobile device, for example, for rendering to a graphical user-interface display of the originating mobile device.

The mobile device based workload distribution system and the method for mobile device based workload distribution disclosed herein provide a technical solution to technical problems related, for example, to workload processing on mobile devices. In many instances, efficiency of mobile device based workload processing can be limited, for example, due to the processing limitations and other such factors for a mobile device. As disclosed herein, the system and method disclosed herein provide the technical solution of a performance degradation detector that is executed by at least one hardware processor to determine whether a processing requirement for a workload exceeds an operational threshold of an associated mobile device, and detect, in response to a determination that the processing requirement for the workload exceeds the operational threshold of the associated mobile device, a performance degradation of the associated mobile device. A workload divider that is executed by the at least one hardware processor may divide, in response to the detected performance degradation of the associated mobile device, the workload into a plurality of workload portions. A workload distributor that is executed by the at least one hardware processor may distribute a workload portion of the plurality of workload portions to a further mobile device for workload processing. A workload receiver that is executed by the at least one hardware processor may receive, from the further mobile device, a processed workload portion related to the distributed workload portion. A workload assembler that is executed by the at least one hardware processor may assemble the processed workload portion related to the distributed workload portion with a plurality of processed workload portions, for example, for rendering on the associated mobile device. A peer-to-peer network analyzer that is executed by the at least one hardware processor may determine a subset of mobile devices, from a plurality of mobile devices of a peer-to-peer network, that is connected to the peer-to-peer network, available to perform the workload processing, and in agreement to perform the workload processing. A workload monitor that is executed by the at least one hardware processor may monitor a progress of the workload processing of the workload portion that is distributed to the further mobile device for workload processing, and in response to a determination that the processed workload portion is not received from the further mobile device within a predetermined time period, mark the workload portion as being unprocessed. The system and method disclosed herein may thus provide the technical solution of improved performance and reduced resource utilization for a mobile device by distributing a workload to another mobile device or a plurality of other mobile devices for processing, where the workload may be divided into workload portions, processed in parallel on another mobile device, or a number of distinct mobile devices of a peer-to-peer network, and the results of the processed workload may be re-assembled on the originating mobile device, for example, for rendering. The system and method disclosed herein may thus provide the technical solution of removing the dependency of a mobile device on central servers, where end users may distribute workload from their own mobile device to other mobile devices of a peer-to-peer network.

FIG. 1 illustrates an environment 100 including a mobile device based workload distribution system 102 (e.g., system 102, or systems 102 (1)-102 (N) as disclosed herein), according to an example of the present disclosure. Referring to FIG. 1, the environment 100 may include a plurality of mobile devices for real-time distribution of processing workloads related to a first mobile device (e.g., mobile device (1)) across a plurality of further mobile devices (e.g., mobile devices (2)-(N)). The mobile devices (1)-(N)) may include PDAs, mobile phones, tablets, laptops, and other wireless mobile devices. The mobile device (1) may also be designated as an originating mobile device, and the mobile devices (2)-(N) may also be designated as receiving mobile devices. The mobile devices (1)-(N) may belong to a peer-to-peer network 104 of mobile devices. The peer-to-peer network 104 of mobile devices may also be designated as a non-centralized or distributed grid of mobile devices. According to an example, the peer-to-peer network 104 may be generated prior to performance degradation detection. However, the particular mobile devices from the peer-to-peer network 104 that are used for workload processing may be dynamically ascertained in real-time. The peer-to-peer network 104 of mobile devices may be described as a network of mobile devices which may include mobile devices that may be used by one of the mobile devices (e.g., mobile device (1)) for processing workloads (e.g., by distributing) related to the one of the mobile devices (e.g., the mobile device (1)). Alternatively or additionally, the peer-to-peer network 104 of mobile devices may be described as a network of mobile devices where any mobile device (e.g., any of the mobile devices (1)-(N)) may share its workload with any other mobile device (e.g., any other one of the mobile devices (1)-(N)), or any other mobile devices (e.g., any other mobile devices (1)-(N)) in the peer-to-peer network 104, and the other mobile device (or devices) in the peer-to-peer network 104 may process the workload as described herein.

Each of the mobile devices (1)-(N) of the peer-to-peer network 104 of mobile devices may include an instantiation of the system 102, respectively designated as systems 102 (1)-102 (N) corresponding to mobile devices (1)-(N). Alternatively, a single system 102 may be disposed as a separate unit from the mobile devices (1)-(N) to control operation of the mobile devices (1)-(N). For the example of FIGS. 1 and 2, each of the mobile devices (1)-(N) of the peer-to-peer network 104 of mobile devices are described as including an instantiation of the system 102 to facilitate an explanation of the operation of the system 102.

According to an example, each of the mobile devices (1)-(N) may include corresponding user-interfaces 106 (1)-106 (N), which may include a graphical user-interface, or another type of user-interface for performing functionality such as rendering of content, receiving selection of options, etc., from a user, etc.

Each of the mobile devices (1)-(N) may include corresponding rendering units 108 (1)-108 (N), which may operate in conjunction with the corresponding user-interfaces 106 (1)-106 (N) to render the content.

Each of the mobile devices (1)-(N) may include corresponding code interpreters 110 (1)-110 (N), which may parse, process, and interpret code related to corresponding applications 112 (1)-112 (N) that are operating on the corresponding mobile devices (1)-(N). According to an example, the applications 112 (1)-112 (N) may be similar or identical in operation on the corresponding mobile devices (1)-(N). For example, a YOUTUBE application on mobile device (1) may be similar or identical in operation to a YOUTUBE application on the mobile devices (2)-(N). Each of the mobile devices (1)-(N) may include a single application, or a plurality of applications that may operate in parallel. For example, the mobile device (1) may include applications 112 (1-1) to 112 (1-M), the mobile device (2) may include applications 112 (2-1) to 112 (2-M), . . . , and the mobile device (N) may include applications 112 (N-1) to 112 (N-M) that may operate in parallel. Parsing the code related to an application may include analyzing the code related to the application for its constituents. Processing the code related to an application may include analyzing the parsed code. Further, interpreting the code related to an application may include determining an action that to be performed based on the processed code, and/or converting the processed code to a language that is specific to the operation of the corresponding mobile device.

Each of the mobile devices (1)-(N) may include corresponding networking controllers 114 (1)-114 (N), which may provide for communication between the mobile devices. For example, the networking controller 114 (1) may be used to communicate with corresponding networking controllers 114 (2)-114 (N) to forward workload portions related to the application 112 (1-1) from the mobile device (1) to one, a subset, or all of the mobile devices (2)-(N). Similarly, the networking controller 114 (1) may be used to communicate with corresponding networking controllers 114 (2)-(N) to receive processed workload portions related to the application 112 (1-1) from the appropriate mobile device of the mobile devices (2)-(N). The networking controllers 114 (1)-114 (N) may provide for communication between the different mobile devices, for example, via Wi-Fi, 3G, 4G, etc., and other types of communication protocols.

According to an example, the networking controllers 114 (1)-114 (N) may provide for communication between the different mobile devices by transmitting a registration message to a public server. Assuming that communication is to be performed between mobile devices (1) and (2), the registration message may include public endpoint information of the mobile device (1). The public endpoint information may include the Internet protocol address and user datagram protocol port fields of the mobile device (1). Thus, the mobile device (1) may request the public server to initiate a direct connection between the mobile device (1) and the mobile device (2) (or any of the mobile devices (2)-(N)) to create a secure network. For example, the public server may forward the public endpoint information of the mobile device (1) to the mobile device (2) (or any of the mobile devices (2)-(N)) to punch a hole in a firewall of the mobile device (2) (or any of the mobile devices (2)-(N)) and establish the direct communication.

Figure 2:
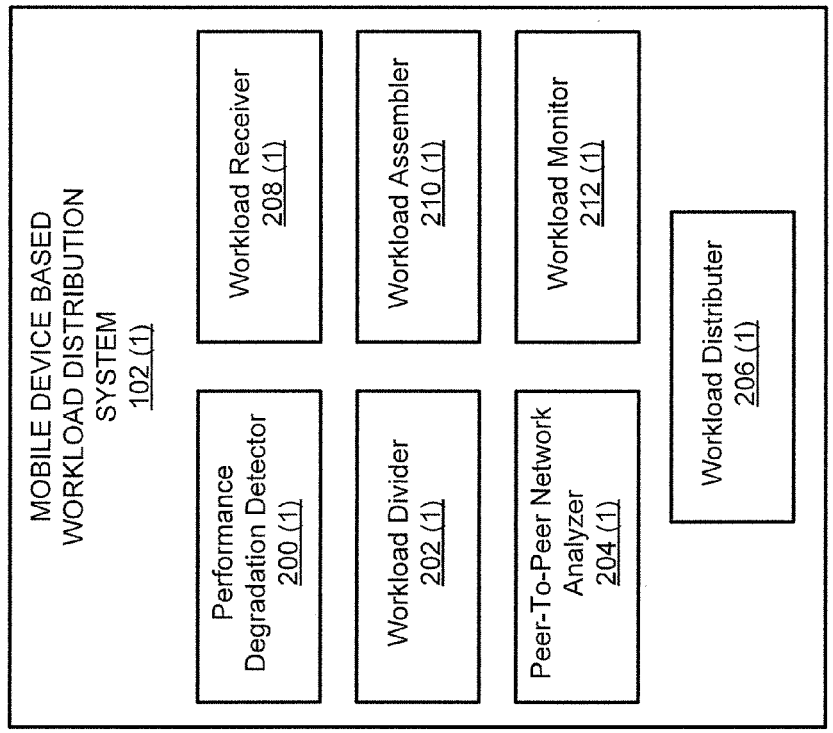
FIG. 2 illustrates an architectural diagram for the mobile device based workload distribution system of FIG. 1, according to an example of the present disclosure.

Referring to FIGS. 1 and 2, FIG. 2 illustrates an architectural diagram for the system 102 (e.g., system 102 (1) of the systems 102 (1)-102 (N)), according to an example of the present disclosure. With respect to the system 102 (1), the components of the system 102 (1) may be similarly included in each of the system 102 (2)-102 (N).

Referring to FIG. 2, in order to initiate the workload distribution between mobile devices, the mobile device (1) in the peer-to-peer network 104 may include a performance degradation detector 200 (1) that is executed by at least one hardware processor (e.g., hardware processor 502 of FIG. 5) to detect performance degradation in the associated mobile device. The performance degradation may be related to processing capabilities of the associated mobile device. For example, the performance degradation detector 200 (1) may determine whether a processing requirement for a workload (i.e., a workload from a single application, or a total number of workloads from a plurality of applications) of the associated mobile device related to factors such as memory usage, central processing unit (CPU) processing, etc., exceeds an operational threshold (e.g., n % of memory, CPU processing capacity, and/or other types of factors that may impact a performance of a mobile device). According to an example, the operational threshold may be user-defined. The performance degradation detector 200 (1) may determine whether a processing requirement for the workload of the associated mobile device (i.e., workload based on an application, or a plurality of applications) effectively overloads the associated mobile device.

In response to a determination by the performance degradation detector 200 (1) that the workload of the associated mobile device exceeds the operational threshold, a workload divider 202 (1) that is executed by the at least one hardware processor may divide the workload of the associated mobile device (1) into workload portions (e.g., packets). In this regard, the workload divider 202 (1) may divide the workload from a single application (e.g., one of the applications 112 (1-1) to (1-M)), or from a plurality of applications (e.g., a plurality of the applications 112 (1-1) to (1-M)) that are operating in parallel and are causing the performance degradation for the associated mobile device, into workload portions. According to an example, the workload divider 202 (1) may divide the workload that includes processing of Extensible Markup Language (XML) data related to a streaming video into workload portions. The dividing of the workload may be performed, for example, based on HyperText Markup Language (HTML) tags, and other such techniques.

A peer-to-peer network analyzer 204 (1) that is executed by the at least one hardware processor may determine, in real-time, all mobile devices from the plurality of mobile devices (e.g., the mobile devices (1)-(N)) of the peer-to-peer network 104 that are connected to the peer-to-peer network 104, available for workload processing, and are in agreement to perform workload processing. The connected mobile devices may be described as devices that are, for example, not powered down, include a sufficient signal strength for workload data transmission, etc. The available mobile devices may be described as devices that, for example, include sufficient processing capacity to process a workload (e.g., the mobile device is operating below an operational threshold), include sufficient battery life, do not expect to shut down, etc. The devices that are in agreement to perform workload processing may be described as devices that may be part of the peer-to-peer network 104, and where a user of the device has authorized the device to perform the workload processing. Based on an analysis of all of the mobile devices from the plurality of mobile devices (e.g., the mobile devices (2)-(N)) of the peer-to-peer network 104 by the peer-to-peer network analyzer 204 (1), the peer-to-peer network analyzer 204 (1) may determine a subset of the mobile devices from the plurality of mobile devices (e.g., mobile devices (2)-(N)) that is connected to the peer-to-peer network 104, available for workload processing, and is willing to perform workload processing.

A workload distributer 206 (1) that is executed by the at least one hardware processor may distribute the workload portions to the subset of the mobile devices to perform workload processing. In this regard, the workload distributer 206 (1) may utilize the networking controller 114 (1) to distribute the workload portions to the subset of the mobile devices to perform workload processing.

The system 102 (1) may include a workload receiver 208 (1) that is executed by the at least one hardware processor to receive the workload portion (or workload portions) allocated to that particular mobile device, parse the code related to the workload portion, and process the code related to the workload portion. For example, the mobile device (2) may include a workload receiver (similar to workload receiver 208 (1)) to receive, from the mobile device (1), the workload portion (or workload portions) allocated to the mobile device (2), parse the code related to the workload portion, and process the code related to the workload portion. For the example of the XML data related to a streaming video, the mobile device (2) may include the workload receiver (similar to workload receiver 208 (1)) to receive, from the mobile device (1), the workload portion (or workload portions) related to the XML data and allocated to the mobile device (2), parse the XML code related to the workload portion, and process the XML code related to the workload portion. The processed code related to the workload portion may be transmitted to the originating mobile device (e.g., the mobile device (1)) by the networking controller. For example, the processed code related to the workload portion may be transmitted to originating mobile device (e.g., the mobile device (1)) by the networking controller (e.g., similar to the networking controller 114 (1)) of the mobile device (2).

The system 102 (1) may include a workload assembler 210 (1) that is executed by the at least one hardware processor to receive the processed workload portion, and assemble the processed workload portion with other processed workload portions. Alternatively or additionally, the workload assembler 210 (1) may receive processed workload portions, and assemble the processed workload portions with other processed workload portions. The assembled processed workload portions may be rendered, executed, or otherwise used by the mobile device (1). For the example of the XML data related to a streaming video, the assembled processed workload portions for the XML data related to a streaming video may be rendered, executed, or otherwise used by the mobile device (1).

The mobile device (1) may include a workload monitor 212 (1) that is executed by the at least one hardware processor to monitor a progress of a workload that is forwarded to another mobile device (e.g., one of the mobile devices (2)-(N)) for processing. In response to a determination that the processed workload is not received from the another mobile device, for example, within a predetermined time period, the workload monitor 212 (1) may mark the workload as being unprocessed, and return the workload and the another mobile device information to the workload distributer 206 (1). The workload distributer 206 (1) may analyze the unprocessed workload to determine whether the unprocessed workload may be processed by a different mobile device (compared to the another mobile device), or if the unprocessed workload should be processed by the mobile device (1). For example, if a time for processing by a different mobile device is greater than a time for processing that is determined or needed for a particular workload portion, the workload portion may be processed by the mobile device (1), and otherwise by the different mobile device.

As disclosed herein, the elements of the system 102 (e.g., the system 102 (1)) may be machine readable instructions stored on a non-transitory computer readable medium. In addition, or alternatively, the elements of the system 102 (e.g., the system 102 (1)) may be hardware or a combination of machine readable instructions and hardware. Further, it should be understood that the system 102 (e.g., the system 102 (1)) may include additional elements, and that one or more of the elements described herein may be removed, combined, and/or modified without departing from the scope of the system 102 (e.g., the system 102 (1)).

Figure 3:
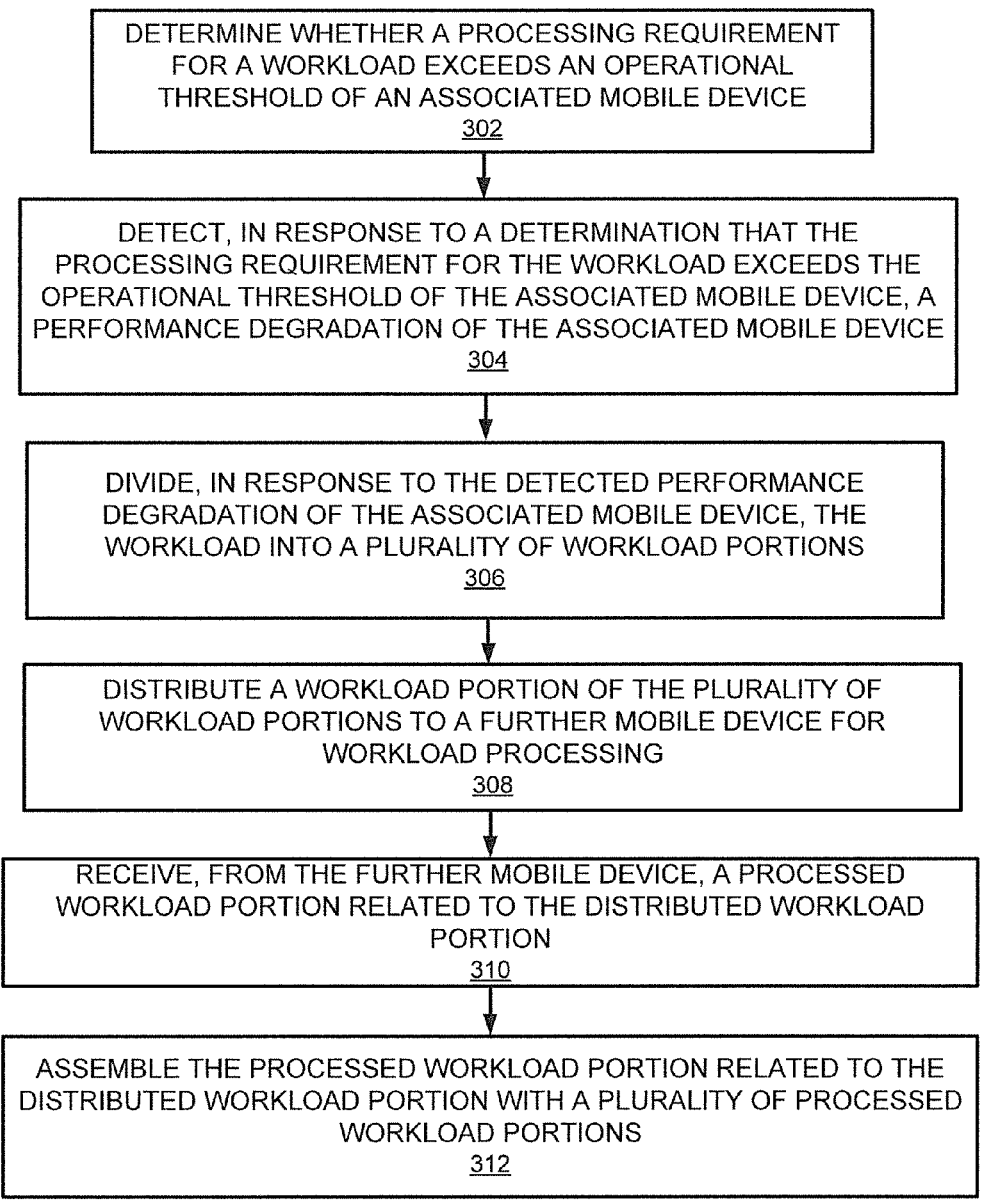
FIG. 3 illustrates a flow diagram of a method for mobile device based workload distribution, according to an example of the present disclosure.
Figure 4:
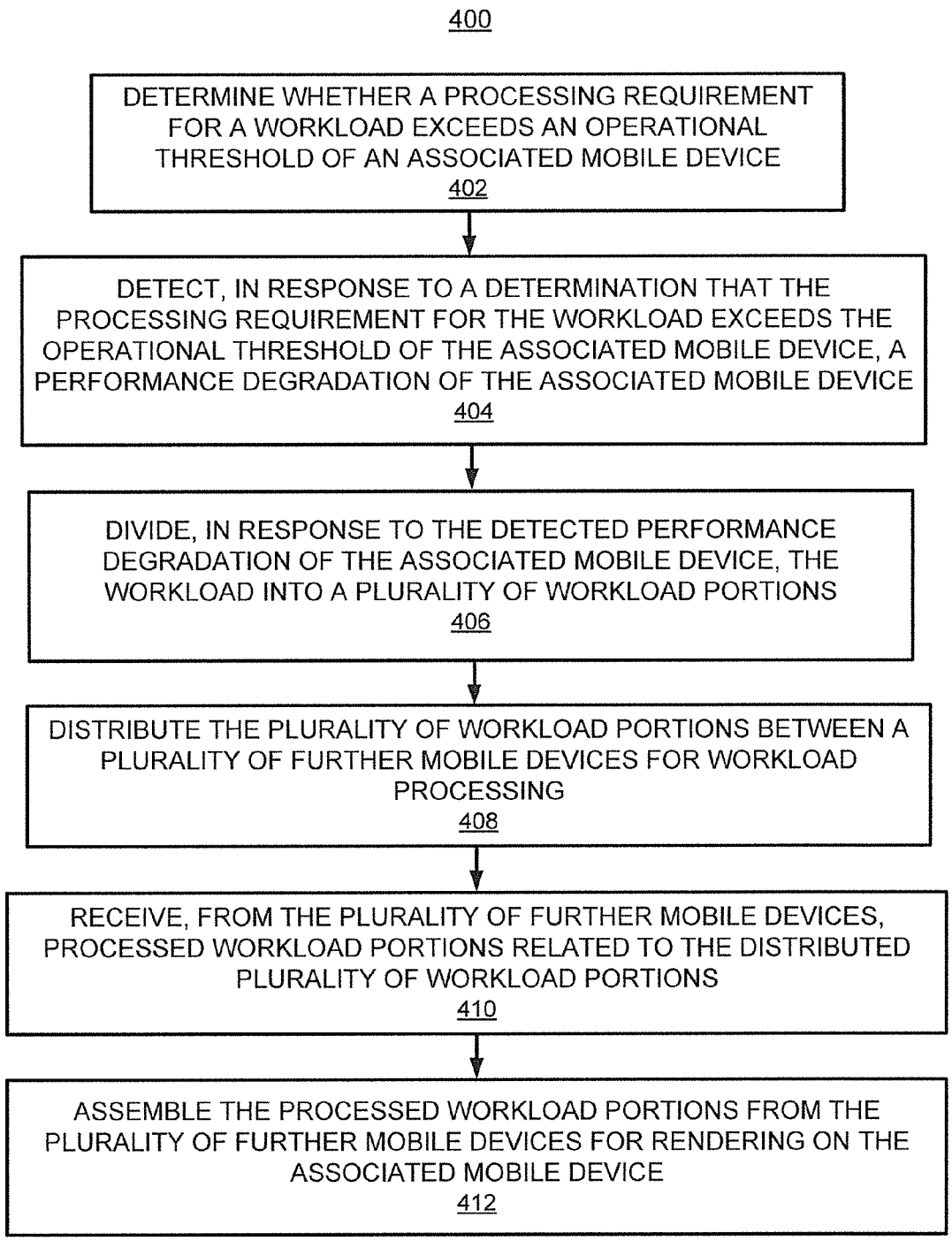
FIG. 4 illustrates another flow diagram of a method for mobile device based workload distribution, according to an example of the present disclosure.

FIGS. 3 and 4 respectively illustrate flowcharts of methods 300 and 400 for mobile device based workload distribution, according to examples. The methods 300 and 400 may be implemented on the system 102 (e.g., the system 102 (1)) described above with reference to FIGS. 1 and 2 by way of example and not limitation. The methods 300 and 400 may be practiced in other systems.

Referring to FIGS. 1-3, and particularly FIG. 3, at block 302, the method 300 may include determining (e.g., by the performance degradation detector 200 (1)) whether a processing requirement for a workload exceeds an operational threshold of an associated mobile device (e.g., the mobile device (1)).

At block 304, the method 300 may include detecting (e.g., by the performance degradation detector 200 (1)), in response to a determination that the processing requirement for the workload exceeds the operational threshold of the associated mobile device (e.g., the mobile device (1)), a performance degradation of the associated mobile device (e.g., the mobile device (1)).

At block 306, the method 300 may include dividing (e.g., by the workload divider 202 (1)), in response to the detected performance degradation of the associated mobile device (e.g., the mobile device (1)), the workload into a plurality of workload portions.

At block 308, the method 300 may include distributing (e.g., by the workload distributer 206 (1)), a workload portion of the plurality of workload portions to a further mobile device (e.g., one of the mobile devices (2)-(N)) for workload processing.

At block 310, the method 300 may include receiving (e.g., by the workload receiver 208 (1)), from the further mobile device (e.g., one of the mobile devices (2)-(N)), a processed workload portion related to the distributed workload portion.

At block 312, the method 300 may include assembling (e.g., by the workload assembler 210 (1)), the processed workload portion related to the distributed workload portion with a plurality of processed workload portions.

According to an example, for the method 300, determining (e.g., by the performance degradation detector 200 (1)) whether the processing requirement for the workload exceeds the operational threshold of the associated mobile device (e.g., the mobile device (1)) may include determining whether the processing requirement for the workload exceeds a memory consumption and/or a CPU processing consumption of the associated mobile device (e.g., the mobile device (1)). The operational threshold may include the memory consumption and/or the CPU processing consumption of the associated mobile device (e.g., the mobile device (1)) exceeding a corresponding predetermined percentage of a memory capacity and a CPU processing capacity of the associated mobile device (e.g., the mobile device (1)).

According to an example, the workload may be based on a single application operating on the associated mobile device (e.g., the mobile device (1)).

According to an example, the workload may be based on a plurality of applications operating in parallel on the associated mobile device (e.g., the mobile device (1)).

According to an example, the method 300 may further include determining (e.g., by the peer-to-peer network analyzer 204 (1)), a subset of mobile devices, from a plurality of mobile devices of a peer-to-peer network 104, that is connected to the peer-to-peer network 104, available to perform the workload processing, and in agreement to perform the workload processing. The plurality of mobile devices may include the associated mobile device (e.g., the mobile device (1)) and the further mobile device (e.g., one of the mobile devices (2)-(N)). The subset of mobile devices may include the further mobile device (e.g., one of the mobile devices (2)-(N)). The method 300 may include distributing (e.g., by the workload distributer 206 (1)) the workload portion of the plurality of workload portions to the further mobile device (e.g., one of the mobile devices (2)-(N)) from the subset of mobile devices.

According to an example, the method 300 may further include determining (e.g., by the peer-to-peer network analyzer 204 (1)), a subset of mobile devices, from a plurality of mobile devices of a peer-to-peer network 104, that is connected to the peer-to-peer network 104 by determining which ones of the plurality of mobile devices are not powered down, and/or include a specified signal strength for workload data transmission.

According to an example, the method 300 may further include determining (e.g., by the peer-to-peer network analyzer 204 (1)), a subset of mobile devices, from a plurality of mobile devices of a peer-to-peer network 104, that is available to perform the workload processing by determining which ones of the plurality of mobile devices include a specified processing capacity to process the workload portion.

According to an example, the method 300 may further include determining (e.g., by the peer-to-peer network analyzer 204 (1)), a subset of mobile devices, from a plurality of mobile devices of a peer-to-peer network 104, that is in agreement to perform the workload processing by determining which ones of the plurality of mobile devices include an authorization to perform the workload processing.

According to an example, the method 300 may further include distributing (e.g., by the workload distributer 206 (1)) the plurality of workload portions to the further mobile device (e.g., one of the mobile devices (2)-(N)) for workload processing, and assembling (e.g., by the workload assembler 210 (1)) the plurality of processed workload portions including the processed workload portion from the further mobile device (e.g., one of the mobile devices (2)-(N)).

According to an example, the method 300 may further include determining (e.g., by the peer-to-peer network analyzer 204 (1)), a subset of mobile devices, from a plurality of mobile devices of a peer-to-peer network 104, that meets a predetermined requirement for the subset of mobile devices, and distributing (e.g., by the workload distributer 206 (1)) the plurality of workload portions to the subset of mobile devices for the workload processing.

According to an example, the method 300 may further include determining (e.g., by the peer-to-peer network analyzer 204 (1)), in real-time, a subset of mobile devices, from a plurality of mobile devices of a peer-to-peer network 104, that meets a predetermined requirement for the subset of mobile devices, and distributing (e.g., by the workload distributer 206 (1)) the plurality of workload portions to the subset of mobile devices for the workload processing.

According to an example, the method 300 may further include monitoring (e.g., by the workload monitor 212 (1)) a progress of the workload processing of the workload portion that is distributed to the further mobile device (e.g., one of the mobile devices (2)-(N)) for workload processing, and marking, in response to a determination that the processed workload portion is not received from the further mobile device (e.g., one of the mobile devices (2)-(N)), the workload portion as being unprocessed.

According to an example, the method 300 may further include monitoring (e.g., by the workload monitor 212 (1)) a progress of the workload processing of the workload portion that is distributed to the further mobile device (e.g., one of the mobile devices (2)-(N)) for workload processing, and marking, in response to a determination that the processed workload portion is not received from the further mobile device (e.g., one of the mobile devices (2)-(N)) within a predetermined time period, the workload portion as being unprocessed. Further, the method 300 may include distributing (e.g., by the workload distributer 206 (1)) the unprocessed workload portion of the plurality of workload portions to a different further mobile device (e.g., another one of the mobile devices (2)-(N)) for the workload processing.

According to an example, the method 300 may further include monitoring (e.g., by the workload monitor 212 (1)) a progress of the workload processing of the workload portion that is distributed to the further mobile device (e.g., one of the mobile devices (2)-(N)) for workload processing, and marking, in response to a determination that the processed workload portion is not received from the further mobile device (e.g., one of the mobile devices (2)-(N)) within a predetermined time period, the workload portion as being unprocessed. The method 300 may further include determining (e.g., by the workload distributer 206 (1)) whether a time of processing associated with the unprocessed workload portion exceeds a predetermined time duration, and distributing, in response to a determination that the time of processing associated with the unprocessed workload portion is less than the predetermined time duration, the unprocessed workload portion of the plurality of workload portions to a different further mobile device (e.g., another one of the mobile devices (2)-(N)) for the workload processing.

Referring to FIGS. 1-4, at block 402, the method 400 may include determining, whether a processing requirement for a workload exceeds an operational threshold of an associated mobile device (e.g., the mobile device (1)).

At block 404, the method 400 may include detecting, in response to a determination that the processing requirement for the workload exceeds the operational threshold of the associated mobile device (e.g., the mobile device (1)), a performance degradation of the associated mobile device (e.g., the mobile device (1)).

At block 406, the method 400 may include dividing, in response to the detected performance degradation of the associated mobile device (e.g., the mobile device (1)), the workload into a plurality of workload portions.

At block 408, the method 400 may include distributing the plurality of workload portions between a plurality of further mobile devices (e.g., one of the mobile devices (2)-(N)) for workload processing.

At block 410, the method 400 may include receiving, from the plurality of further mobile devices (e.g., one of the mobile devices (2)-(N)), processed workload portions related to the distributed plurality of workload portions.

At block 412, the method 400 may include assembling the processed workload portions from the plurality of further mobile devices (e.g., one of the mobile devices (2)-(N)) for rendering on the associated mobile device (e.g., the mobile device (1)).

According to an example, for the method 400, determining whether the processing requirement for the workload exceeds the operational threshold of the associated mobile device (e.g., the mobile device (1)) may further include determining whether the processing requirement for the workload exceeds a memory consumption and/or a CPU processing consumption of the associated mobile device (e.g., the mobile device (1)). The operational threshold may include the memory consumption and/or the CPU processing consumption of the associated mobile device (e.g., the mobile device (1)) exceeding a corresponding predetermined percentage of a memory capacity and a CPU processing capacity of the associated mobile device (e.g., the mobile device (1)).

According to an example, the method 400 may further include determining the plurality of further mobile devices (e.g., one of the mobile devices (2)-(N)), from a group of mobile devices of a peer-to-peer network 104, that is connected to the peer-to-peer network 104, available to perform the workload processing, and/or in agreement to perform the workload processing.

According to an example, a method for mobile device based workload distribution may include receiving, by a receiving mobile device, a workload portion of a plurality of workload portions that represent a divided workload from an originating mobile device, and parsing, by a hardware processor of the receiving mobile device, code related to the workload portion. The method for mobile device based workload distribution may further include processing, by the receiving mobile device, the parsed code related to the workload portion, and transmitting, from the receiving mobile device to the originating mobile device, the processed code related to the workload portion. The method for mobile device based workload distribution may further include transmitting, from the receiving mobile device, a signal to the originating mobile device to confirm that the receiving mobile device is available to perform workload processing related to the workload portion, and in agreement to perform the workload processing related to the workload portion. The method for mobile device based workload distribution may further include determining, by the receiving mobile device, whether a processing requirement for the workload portion exceeds a memory consumption and/or a CPU processing consumption of the receiving mobile device, and in response to a determination that the processing requirement for the workload portion does not exceed the at least one of the memory consumption and the CPU processing consumption of the receiving mobile device, transmitting, from the receiving mobile device, a confirmation of an availability of the receiving mobile device to process the workload portion.

Figure 5:
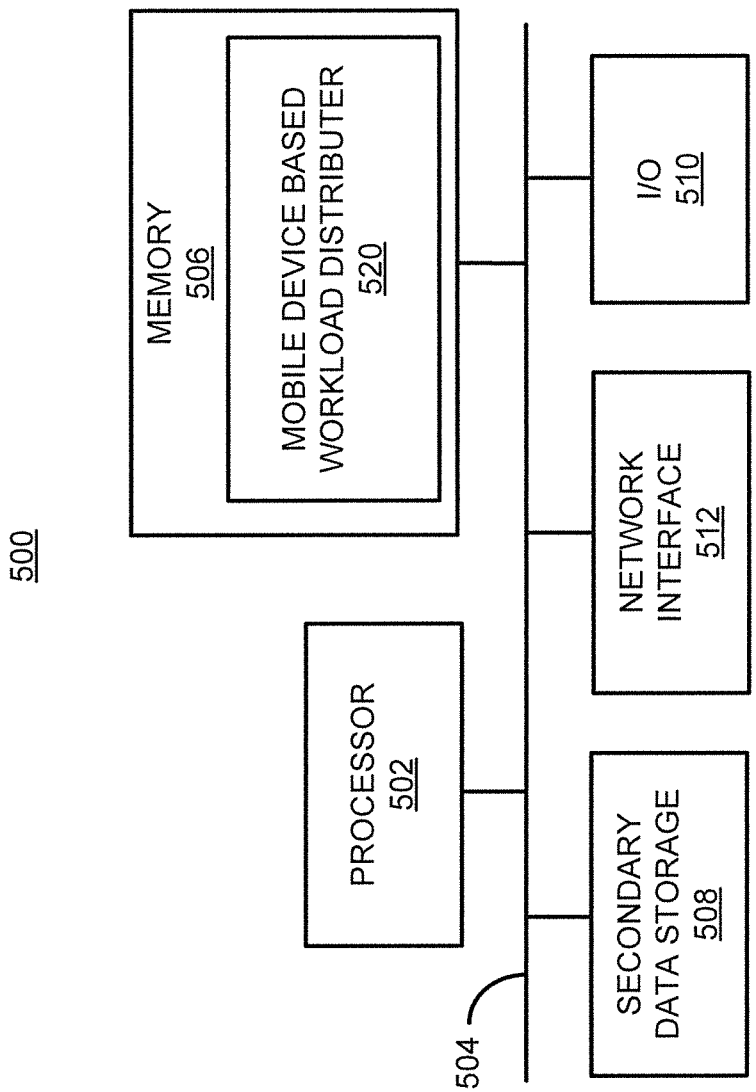
FIG. 5 illustrates a computer system, according to an example of the present disclosure.

FIG. 5 shows a computer system 500 that may be used with the examples described herein. The computer system may represent a generic platform that includes components that may be in a server or another computer system. The computer system 500 may be used as a platform for the system 102. The computer system 500 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 500 may include a processor 502 that may implement or execute machine readable instructions performing some or all of the methods, functions and other processes described herein. Commands and data from the processor 502 may be communicated over a communication bus 504. The computer system may also include a main memory 506, such as a random access memory (RAM), where the machine readable instructions and data for the processor 502 may reside during runtime, and a secondary data storage 508, which may be non-volatile and stores machine readable instructions and data. The memory and data storage are examples of computer readable mediums. The memory 506 may include a mobile device based workload distributer 520 including machine readable instructions residing in the memory 506 during runtime and executed by the processor 502. The mobile device based workload distributer 520 may include the elements of the system 102 (e.g., the system 102 (1), the system 102 (2), etc.) shown in FIGS. 1 and 2.

The computer system 500 may include an I/O device 510, such as a keyboard, a mouse, a display, etc. The computer system may include a network interface 512 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A mobile device based workload distribution system comprising:
    a performance degradation detector, executed by at least one hardware processor, to
        determine whether a processing requirement for a workload exceeds an operational threshold of an associated mobile device, and
        detect, in response to a determination that the processing requirement for the workload exceeds the operational threshold of the associated mobile device, a performance degradation of the associated mobile device;
    a workload divider, executed by the at least one hardware processor, to divide, in response to the detected performance degradation of the associated mobile device, the workload into a plurality of workload portions;
    a workload distributer, executed by the at least one hardware processor, to distribute a workload portion of the plurality of workload portions to a further mobile device for workload processing;
    a workload monitor, executed by the at least one hardware processor,
        to monitor a progress of the workload processing of the workload portion that is distributed to the further mobile device for workload processing, and
        in response to a determination that a processed workload portion related to the distributed workload portion is not received from the further mobile device, mark the workload portion that is distributed to the further mobile device for workload processing as being unprocessed,
        where the workload distributer is to
            determine whether a time of processing associated with the unprocessed workload portion exceeds a predetermined time duration, and
            in response to a determination that the time of processing associated with the unprocessed workload portion is less than the predetermined time duration, distribute the unprocessed workload portion of the plurality of workload portions to a different further mobile device for the workload processing;
    a workload receiver, executed by the at least one hardware processor, to receive, from the further mobile device or the different further mobile device, the processed workload portion related to the distributed workload portion; and
    a workload assembler, executed by the at least one hardware processor, to assemble the processed workload portion related to the distributed workload portion with a plurality of processed workload portions.

2. The mobile device based workload distribution system according to claim 1, where the performance degradation detector is to determine whether the processing requirement for the workload exceeds the operational threshold of the associated mobile device by
    determining whether the processing requirement for the workload exceeds at least one of a memory consumption and a central processing unit (CPU) processing consumption of the associated mobile device, where the operational threshold includes the at least one of the memory consumption and the CPU processing consumption of the associated mobile device exceeding a corresponding predetermined percentage of a memory capacity and a CPU processing capacity of the associated mobile device.

3. The mobile device based workload distribution system according to claim 1, where the workload is based on a single application operating on the associated mobile device.

4. The mobile device based workload distribution system according to claim 1, where the workload is based on a plurality of applications operating in parallel on the associated mobile device.

5. The mobile device based workload distribution system according to claim 1, further comprising:
a peer-to-peer network analyzer, executed by the at least one hardware processor, to determine a subset of mobile devices, from a plurality of mobile devices of a peer-to-peer network, that is connected to the peer-to-peer network, available to perform the workload processing, and in agreement to perform the workload processing,
where the plurality of mobile devices includes the associated mobile device and the further mobile device,
where the subset of mobile devices includes the further mobile device, and
where the workload distributer is to distribute the workload portion of the plurality of workload portions to the further mobile device from the subset of mobile devices.

6. The mobile device based workload distribution system according to claim 1, further comprising:
a peer-to-peer network analyzer, executed by the at least one hardware processor, to determine a subset of mobile devices, from a plurality of mobile devices of a peer-to-peer network, that is connected to the peer-to-peer network by determining which ones of the plurality of mobile devices at least one of
are not powered down, and
include a specified signal strength for workload data transmission.

7. The mobile device based workload distribution system according to claim 1, further comprising:
a peer-to-peer network analyzer, executed by the at least one hardware processor, to determine a subset of mobile devices, from a plurality of mobile devices of a peer-to-peer network, that is available to perform the workload processing by determining which ones of the plurality of mobile devices include a sufficient battery life to process the workload portion.

8. The mobile device based workload distribution system according to claim 1, further comprising:
a peer-to-peer network analyzer, executed by the at least one hardware processor, to determine a subset of mobile devices, from a plurality of mobile devices of a peer-to-peer network, that is in agreement to perform the workload processing by determining which ones of the plurality of mobile devices include an authorization to perform the workload processing.

9. The mobile device based workload distribution system according to claim 1, where
the workload distributer is to distribute the plurality of workload portions to the further mobile device for workload processing, and
the workload assembler is to assemble the plurality of processed workload portions including the processed workload portion from the further mobile device.

10. The mobile device based workload distribution system according to claim 1, further comprising:
a peer-to-peer network analyzer, executed by the at least one hardware processor, to determine a subset of mobile devices, from a plurality of mobile devices of a peer-to-peer network, that meets a predetermined requirement for the subset of mobile devices, where the workload distributer is to distribute the plurality of workload portions to the subset of mobile devices for the workload processing.

11. The mobile device based workload distribution system according to claim 1, further comprising:
a peer-to-peer network analyzer, executed by the at least one hardware processor, to determine, in real-time, a subset of mobile devices, from a plurality of mobile devices of a peer-to-peer network, that meets a predetermined requirement for the subset of mobile devices, where the workload distributer is to distribute the plurality of workload portions to the subset of mobile devices for the workload processing.

12. The mobile device based workload distribution system according to claim 1, where in response to a determination that the time of processing associated with the unprocessed workload portion is greater than the predetermined time duration, the workload distributer is to process the unprocessed workload portion at the associated mobile device.

13. The mobile device based workload distribution system according to claim 1, further comprising:
a peer-to-peer network analyzer, executed by the at least one hardware processor, to determine a subset of mobile devices, from a plurality of mobile devices of a peer-to-peer network, that is available to perform the workload processing by determining which ones of the plurality of mobile devices do not expect to shut down prior to processing the workload portion.

14. A non-transitory computer readable medium having stored thereon machine readable instructions for mobile device based workload distribution, the machine readable instructions when executed cause a computer system to:
determine whether a processing requirement for a workload exceeds an operational threshold of an associated mobile device;
detect, in response to a determination that the processing requirement for the workload exceeds the operational threshold of the associated mobile device, a performance degradation of the associated mobile device;
divide, in response to the detected performance degradation of the associated mobile device, the workload into a plurality of workload portions;
determine a plurality of further mobile devices, from a group of mobile devices of a peer-to-peer network, that are connected to the peer-to-peer network and include a specified signal strength for workload data transmission;
distribute the plurality of workload portions between the plurality of further mobile devices for workload processing;
receive, from the plurality of further mobile devices, processed workload portions related to the distributed plurality of workload portions; and
assemble the processed workload portions from the plurality of further mobile devices for rendering on the associated mobile device.

15. The non-transitory computer readable medium according to claim 14, the machine readable instructions when executed further cause the computer system to:
monitor a progress of the workload processing of the plurality of workload portions that are distributed to the plurality of further mobile devices for workload processing; and
in response to a determination that a processed workload portion of the plurality of processed workload portions is not received from the plurality of further mobile devices, mark the workload portion as being unprocessed.

16. The non-transitory computer readable medium according to claim 14, the machine readable instructions when executed further cause the computer system to:
monitor a progress of the workload processing of the plurality of workload portions that are distributed to the plurality of further mobile devices for workload processing;
in response to a determination that a processed workload portion of the plurality of processed workload portions is not received from the plurality of further mobile devices within a predetermined time period, mark the workload portion as being unprocessed; and
distribute the unprocessed workload portion of the plurality of workload portions to a different further mobile device for the workload processing.

17. A method for mobile device based workload distribution, the method comprising:
determining, by a hardware processor, whether a processing requirement for a workload exceeds an operational threshold of an associated mobile device;
detecting, in response to a determination that the processing requirement for the workload exceeds the operational threshold of the associated mobile device, a performance degradation of the associated mobile device;
dividing, in response to the detected performance degradation of the associated mobile device, the workload into a plurality of workload portions;
determining a plurality of further mobile devices, from a group of mobile devices of a peer-to-peer network, that are connected to the peer-to-peer network and include a specified signal strength for workload data transmission;
distributing the plurality of workload portions between the plurality of further mobile devices for workload processing;
receiving, from the plurality of further mobile devices, processed workload portions related to the distributed plurality of workload portions; and
assembling the processed workload portions from the plurality of further mobile devices for rendering on the associated mobile device.

18. The method for mobile device based workload distribution according to claim 17, where determining whether the processing requirement for the workload exceeds the operational threshold of the associated mobile device further comprises:
determining whether the processing requirement for the workload exceeds at least one of a memory consumption and a central processing unit (CPU) processing consumption of the associated mobile device, where the operational threshold includes the at least one of the memory consumption and the CPU processing consumption of the associated mobile device exceeding a corresponding predetermined percentage of a memory capacity and a CPU processing capacity of the associated mobile device.

19. A non-transitory computer readable medium having stored thereon machine readable instructions for mobile device based workload distribution, the machine readable instructions when executed cause a receiving mobile device to:
receive a workload portion of a plurality of workload portions that represent a divided workload from an originating mobile device;
determine whether a processing requirement for the workload portion exceeds at least one of a memory consumption and a central processing unit (CPU) processing consumption of the receiving mobile device;
in response to a determination that the processing requirement for the workload portion does not exceed the at least one of the memory consumption and the CPU processing consumption of the receiving mobile device, transmit a confirmation of an availability of the receiving mobile device to process the workload portion;
parse code related to the workload portion;
process the parsed code related to the workload portion; and
transmit, to the originating mobile device, the processed code related to the workload portion.

20. The non-transitory computer readable medium according to claim 19, further comprising machine readable instructions that when executed further cause the receiving mobile device to:
transmit a signal to the originating mobile device to confirm that the receiving mobile device is
in agreement to perform the workload processing related to the workload portion.

21. The mobile device based workload distribution system according to claim 1, further comprising:
a peer-to-peer network analyzer, executed by the at least one hardware processor, to determine a subset of mobile devices, from a plurality of mobile devices of a peer-to-peer network, that is in agreement to perform the workload processing by determining which ones of the plurality of mobile devices include a user authorization to process the workload portion.

* * * * *